Patented Apr. 26, 1932

1,855,289

UNITED STATES PATENT OFFICE

JOSEF HALLER, OF LEVERKUSEN-WIESDORF, AND GEORG RÖSCH, OF COLOGNE-MUL-HEIM, GERMANY, ASSIGNORS TO GENERAL ANILINE WORKS, INC., OF NEW YORK, N. Y., A CORPORATION OF DELAWARE

MANUFACTURE OF WATER SOLUBLE AZO DYESTUFFS

No Drawing. Application filed May 9, 1931, Serial No. 536,314, and in Germany May 14, 1930.

The present invention relates to a process of preparing water soluble azo dyestuffs containing an anthra-hydroquinone nucleus.

In accordance with the invention water soluble azo dyestuffs are obtained in the following manner:—

Beta-aminoanthraquinone is transformed into the sulfamic acid of beta-aminoanthrahydroquinone-9.10-disulfuric acid ester, for example, by treatment of beta-aminoanthrahydroquinone with chlorosulfonic acid. The sulfuric acid ester thus obtainable, which probably corresponds to the formula:—

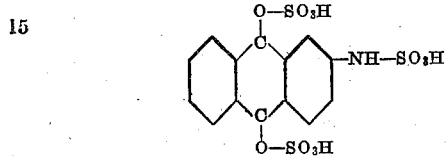

is then diazotized, for example, in a mineral acid medium (dilute hydrochloric-, or sulfuric acid of about 1–5% strength). As diazotizing agents water soluble nitrites, such as for example, alkali metal or ammonium nitrates, are advantageously applied in molecular or somewhat larger amounts. Likewise, it will be possible to replace the nitrites by other diazotizing agents, for example, nitric oxides or amyl nitrite.

The temperature during diazotization may vary in rather wide limits. Advantageously, the temperature should not exceed about 30° C., since otherwise side reactions may occur. The best results are generally obtained at a temperature between about 0–20° C. The diazo derivative of 2-amino-anthrahydroquinone-9.10-disulfuric acid ester is then coupled with a coupling component not containing sulfuric acid or carboxylic acid groups.

As coupling components there may be mentioned by way of example napthols, such as alpha- or beta-napthol, benzoyl-alpha-naphthol, 1-acetylamino-7-naphthol, 1-(2'.4'-dichloro)-benzoylamino-7-naphthol, 4-cloro-1-napththol etc.; arylides of 2, 3-hydroxy-naphthoic acid, such as the anilide, the naphthylamides, the ortho-anisidide of ortho-hydroxy-naphthoic acid etc.; pyrazolens, such as 1-phenyl-3-methyl-5-pyrazolone, pyrazolones being halogenated in the benzene nucleus etc.; aceto acetic acid arylides, such as the anilide, chloroanilides, ortho-anisidide of aceto-acetic acid etc.

The coupling reaction is advantageously performed by dissolving the coupling component in water with the addition of an alkali, such as caustic soda solution, or, more advantageously, sodium or potassium carbonate, and causing the reddish colored diazo solution obtained as described above to run slowly into the alkaline solution of the coupling component. Reaction takes place in many cases at normal or even lower temperature; in other cases heating is advantageous to accelerate the coupling reaction. Generally, we prefer to work at a temperature between about 10–30° C. Higher temperatures will likewise be operable but are generally unnecessary.

The isolation of the azo dyestuffs may be performed in the usual manner, for example, by salting out.

It is to be mentioned that instead of starting with the sulfamic acid of beta-aminoanthrahydro-quinone-9.10-disulfuric acid ester istelf, nuclear substitution products thereof, especially halogen substitution products may be applied, diazotization and the coupling reaction being performed in this case in the same manner as described above for the unsubstituted compound.

When working in this manner water soluble azo dyestuffs containing an anthrahydroquinone nucleus esterified in the meso-positions by sulfuric acid are obtained in an extremely convenient manner without protecting the amino group by acylation before preparing the beta-aminoanthrahydroquinone disulfuric acid esters. It is the crux of the present invention to have found that the sulfamic acids of the beta-amino-anthrahydroquinone disulfuric acid ester or of substitution products thereof, which are directly formed when esterifying beta-aminoanthrahydroquinone, for example, with chlorosulfonic acid, can be easily diazotized without simultaneous saponification of the sulfuric acid ester groups. A method has thus become available, which allows to prepare the water soluble azo dyestuffs in question in an especially simple and cheap manner.

The dyestuffs may be used for dyeing wool from an acid bath or cotton from an alkaline bath, the dyeings being developed by treating the same with oxidizing agents in an acid medium, for example, with sodium nitrate in dilute hydrochloric acid or sodium bichromate in dilute sulfuric acid. Likewise, the dyestuff may be applied for printing purposes, for example, by preparing in the usual manner a printing paste containing sodium chlorate and ammonium thiocyanate, printing textile fibres with these printing pastes, developing the printings by steaming in a Mather-Platt apparatus and soaping at the boil. In all cases during the development of the printings or dyeings the sulfuric acid ester groups are split off with the formation of water insoluble dyestuffs on the fibre, which dyestuffs contain a substituted or unsubstituted anthraquinone nucleus.

The following examples will illustrate our invention, without however restricting it thereto; the parts being by weight:—

*Example 1.*—To a solution of 100 parts of the potassium salt of the sulfamic acid of 2-aminoanthrahydroquinone-9.10-sulfuric acid ester in 500 parts of water, 100 parts of aqueous 20% hydrochloric acid are added at about 0° C. To this solution 100 parts of a 10% aqueous sodium nitrite solution are added while stirring and cooling with ice. The solution soon becomes red and after the nitrite has been consumed, the solution is stirred into an aqueous solution of 45 parts of the ortho-anisidide of 2.3-hydroxynaphthoic acid, rendered alkaline with caustic soda solution and potassium carbonate. After stirring for some time, the dyestuff having formed is isolated by salting out. It dissolves in water with a violet coloration and dyes textile fibres violet shades, which on treatment with sodium nitrite and dilute hydrochloric acid turn to red with the formation of the dyestuff from diazotized beta-aminoanthraquinone and the ortho-anisidide of 2.3-hydroxynaphthoic acid.

A similar dyestuff (of still better fastness properties) is obtained, when replacing in the above example the sulfamic acid of 2-aminoanthrahydroquinone-9.10-disulfuric acid ester by the equivalent quantity of the sulfamic acid of 2-amino-3-bromoanthrahydroquinone-9.10-disulfuric acid ester.

*Example 2.*—22.3 parts of 2-aminoanthraquinone are transformed into the sulfamic acid of 2-amino-anthrahydroquinone-9.10-disulfuric acid ester; the ester is dissolved in 1000 parts of water. 30 parts of aqueous hydrochloric acid of 37% strength are added at 5–10° C., whereafter 69 parts of a 10% aqueous sodium nitrite solution are caused to run in while stirring, within 30 minutes. After the sodium nitrite is consumed the suspension of the red diazonium salt is mixed at about 5–10° C., while stirring, with a solution of 14.5 parts of beta-naphthol, 8 parts of sodium hydroxide and 11 parts of anhydrous sodium carbonate in 500 parts of water. The formation of the azo dyestuff is soon finished, and the dyestuff is isolated by salting out. It dissolves in water with a red coloration and dyes animal and vegetable fibres brownish-red shades, which on treatment with, for example, sodium bichromate and dilute sulfuric acid, turn to orange. The dyestuff formed by this aftertreatment is identical to the dyestuff obtainable by coupling diazotized 2-aminoanthraquinone with beta-naphthol (see Gattermann, Annalen der Chemie, vol. 425, (1921) pg. 157).

*Example 3.*—18 parts of 1-phenyl-3-methyl-5-pyrazolone are dissolved in 800 parts of water with the addition of 16 parts of sodium hydroxide, to which solution the diazo solution described in Example 2 is added. Coupling is complete within some minutes with the formation of a reddish-brown dyestuff, which is isolated by salting out. It dyes wool from an acid bath red shades, turning to a reddish-yellow on treatment with an oxidizing agent as described in the above examples.

We claim:—

1. In the process of preparing water soluble azo dyestuffs the step which comprises diazotizing a compound of the probable formula

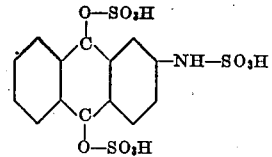

in which the anthraquinone nucleus may be substituted by halogen atoms.

2. In the process of preparing water soluble azo dyestuffs the step which comprises diazotizing a compound of the probable formula

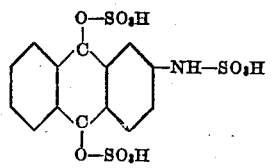

in which the anthraquinone nucleus may be substituted by halogen atoms by means of an alkali metal nitrite in a mineral acid medium.

3. Process which comprises diazotizing a compound of the probable formula

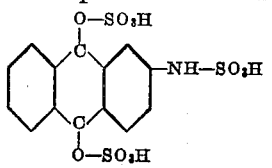

in which the anthraquinone nucleus may be substituted by halogen atoms, and coupling the diazo compound thus obtainable with a coupling component not containing sulfonic acid or carboxylic acid groups.

4. Process which comprises diazotizing a compound of the probable formula

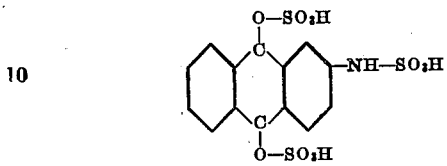

in which the anthraquinone nucleus may be substituted by halogen atoms by means of an alkali metal nitrite in a mineral acid medium, and coupling the diazo compound thus obtainable with a coupling component not containing sulfonic acid or carboxylic acid groups.

5. Process which comprises diazotizing the sulfamic acid derived from beta-aminoanthrahydroquinone-9.10-disulfuric acid ester, and coupling it with the ortho-anisidide of 2.3-hydroxynaphthoic acid.

6. Process which comprises diazotizing the sulfamic acid derived from beta-aminoanthrahydroquinone-9.10-disulfuric acid ester by means of an alkali metal nitrite in a mineral acid medium, and coupling it with the ortho-anisidide of 2.3-hydroxynaphthoic acid.

7. Process which comprises diazotizing the sulfamic acid derived from 3-bromo-2-amino - anthrahydroquinone -9.10- disulfuric acid ester, and coupling it with the ortho-anisidide of 2.3-hydroxynaphthoic acid.

8. Process which comprises diazotizing the sulfamic acid derived from 3-bromo-2-amino-anthrahydroquinone - 9.10 - disulfuric acid ester by means of an alkali metal nitrite in a mineral acid medium, and coupling it with the ortho-anisidide of 2.3-hydroxynaphthoic acid.

In testimony whereof, we affix our signatures.

JOSEF HALLER.
GEORG RÖSCH.